United States Patent [19]

Prunkard

[11] Patent Number: 4,857,783
[45] Date of Patent: Aug. 15, 1989

[54] BRUSHLESS DIRECT CURRENT MOTOR INCORPORATING A MAGNETICALLY INFLUENCED SWITCH

[75] Inventor: Randall K. Prunkard, Woodbridge, Va.

[73] Assignee: James N. Papanicolas, Fairfax, Va.

[21] Appl. No.: 156,975

[22] Filed: Feb. 18, 1988

[51] Int. Cl.⁴ .................. H02K 21/14; H02K 11/00
[52] U.S. Cl. .................. 310/68 B; 200/404; 310/67 R
[58] Field of Search ............ 200/67 F, 19 M, 80 R, 200/80 B; 335/205, 206; 310/24, 40 MM, 46, 67 R, 68 B, 67 F, 156, 177, 268

[56] References Cited

U.S. PATENT DOCUMENTS

| | | | |
|---|---|---|---|
| 2,459,930 | 1/1949 | Fink | 200/67 F |
| 2,606,222 | 8/1952 | Clifford et al. | |
| 2,861,204 | 11/1958 | Bauer | 310/46 |
| 3,297,891 | 1/1967 | Foran, Jr. | 310/46 |
| 3,662,196 | 5/1972 | Ruschmann | 310/46 |
| 3,688,136 | 8/1972 | Salverda | 310/24 |
| 4,311,933 | 1/1982 | Riggs et al. | 310/156 |
| 4,357,563 | 11/1981 | Ohno | 310/67 R |
| 4,517,477 | 5/1985 | Pankratz | 310/23 |
| 4,642,534 | 2/1987 | Mitchell | 318/138 |

Primary Examiner—Patrick R. Salce
Assistant Examiner—D. L. Rebsch
Attorney, Agent, or Firm—Hoffman, Wasson, Fallow & Gitler

[57] ABSTRACT

A brushless direct current (DC) motor operating on the interaction of a permanent magnet rotor with an electromagnetic torque-inducing stator coil. Current applied to an electromagnetic torque-inducing stator coil is controlled by a magnetically influenced reed or leaf switch.

10 Claims, 5 Drawing Sheets

BRUSHLESS DIRECT CURRENT MOTOR INCORPORATING A MAGNETICALLY INFLUENCED SWITCH

BACKGROUND OF THE INVENTION

Brushless DC motors have been well known in the art for approximately two decades. Generally, brushless DC motors are smaller but are more costly than both AC motors and conventional DC motors of equal horsepower (HP) ratings. However, the initial increase in the cost of these motors is offset by reduced maintenance costs over the life of the motor. Additionally, due to the fact that control circuitry can be an integral part of the motor, brushless DC motors offer both little or no maintenance, and would also allow small signal control of the rotating speed of the rotor. Furthermore, since brushless DC motors do not, of course, utilize brushes, they do not create brush arcing and thereby eliminate electromagnetic interference (EMI) and explosion hazards. Additionally, brushless DC motors offer a reduction in acoustic noise, often due solely to brush friction, and do not produce carbon residue or gaseous by-product associated with conventional motor operation. Brushless DC motors are generally more efficient than conventional DC motors and have a fairly constant torque versus input current characteristic. Finally, brushless DC motors have a lower servo-time constant, and thus provide a more rapid output response. The combination of the foregoing list of advantages makes brushless DC motors suitable for submerged operation, operation in a combustible atmosphere, or operation in a high vacuum.

There are three basic types of brushless DC motors. A first type is known as the DC/AC Inverter Brushless DC motor. This type is characterized by the fact that it can be operated only from a DC power supply. Furthermore, brushless DC motors of this type employ an AC servomotor incorporating an electronic inverter energized by the same DC power supply.

A second type of brushless DC motor is known as the Limited Rotation Brushless DC motor. This motor is unique in that it is not intended for continuous rotation in ordinary use, and it can only provide an output torque over a partial radius of operation, typically ±90° maximum. Output rotation may be counterclockwise (CCW) or clockwise (CW) dependent upon the polarity of the direct current energizing its stator coil.

The third type of brushless DC motor is the Electronic Commutation Brushless DC motor. This type of brushless DC motor is distinguished from the other two types of brushless motors by the utilization of a wound torque inducing coil, a permanent magnet (PM) rotor and a rotor position sensor which serves to energize the torque inducing coil in synchronization with the rotor movement. Proper synchronization with rotor movement eliminates the need for commutator and brush assemblies found on conventional motors. The rotor position sensor is usually electronic in nature and incorporates high speed switching transistors. The high speed switching transistors can be activated by any number of devices that are capable of "sensing" the rotor's position. Devices contemplated for this purpose can be cam shaped light shields or other photoelectric sensor arrangements secured to the rotor shaft, magnetic transducers, Hall Effect devices, piezoelectric crystal transducers, electrostatic sensors or electromagnetic induction coils. The sole purpose of the rotor position sensor is to provide a signal upon which the transistor switch can become activated.

U.S. Pat. No. 3,662,196 to Ruschmann discloses a brushless DC motor incorporating a fixed permanent magnetic field interacting with a second movable magnetic field that changes polarity, such as an armature winding. Current is carried from an external circuit to the armature winding via switches arranged in two circular arrays and equiangularly spaced within each array. This patent involves the use of many parts that are expensive to manufacture and require labor intensive methods of assembly.

U.S. Pat. No. 4,517,477 to Pankratz describes the use of one or more permanent magnets to form a rotor, wherein each magnet has first and second poles of opposite polarity. The magnets are arranged such that alternating first and second poles are spaced angularly, relative to the rotor. A magnetic device defining a stator alternates between a first phase attracting the first pole of a given magnet, and a second phase repelling the second pole of the given magnet. Timing devices detect the position of the magnet and signal the magnetic device for alternating between the first and second phases. A solenoid, responsive to the timing means, selectively and alternately positions the stator magnets in close proximity to the rotor for alternately attracting or repelling the rotor magnets. The Pankratz patent employs an elaborate and precisely formed rotor, requiring that the rotor have a groove or track through which the stator magnet is seated. Furthermore, the rotor magnets, which are commercially available bar-type magnets, must be reformed into an arcuate pattern in order to function properly on the rotor periphery.

U.S. Pat. No. 3,688,136 to Salverda discusses a brushless DC motor having a rotor carrying permanent magnets at its outer ends. These magnets are repulsed by pusher magnets that are oriented in the same direction as the rotor magnets. Cam operated solenoids interject the pusher magnets into close proximity behind the rotor magnets. The Salverda patent requires many moving parts and elaborate circuitry for operating the cam timing means and solenoid linkage. These shortcomings represent an undesirable drain on the DC power supply of the motor, a costly sacrifice to the operational advantages of a brushless DC motor.

SUMMARY OF THE INVENTION

The present invention overcomes the foregoing disadvantages by providing a highly efficient, reliable, simply constructed, and inexpensive, brushless DC motor.

The present invention uses the potential energy that is stored in a permanent magnetic field to influence an electrically induced magnetic field so as to cause rotation of the permanent magnetic field and thereby produce a motive force.

In order to accomplish this result, the present invention relies upon a rotor having a flat, annular two pole permanent magnet through which a rotational output shaft passes. A magnetic leaf switch which tends to 'float' in the magnetic field of the permanent magnet and a ferrous core coil winding that serves as a stator is also provided. The stator is energized by an adequate source of direct current. Current flow to the stator from the direct current source is controlled in an alternating on-off manner by the correspondingly on-off action of the magnetic leaf switch. When the stator is energized, its ferrous core assumes a polarity that repels at least one of the poles of the permanent magnet carried by the rotor. This repulsion causes rotation of the permanent magnet about the longitudial axis of the rotational output shaft.

The present invention requires only a few parts in order to operate. Furthermore, it does not require a housing nor a flywheel. The present invention can be used to drive any type of rotation load such as a grinding wheel, centrifugal pump impeller or geared drive train.

BRIEF DESCRIPTION OF THE DRAWINGS

These features and advantages obtained by the use of the present invention may be better understood by reference to the following drawings, which set forth structure embodying features of the present invention and the principles thereof that are considered to be the best mode in which to apply these principles, wherein.

DETAILED DESCRIPTION OF THE PREFERRED EMBODIMENT

Figure 1:
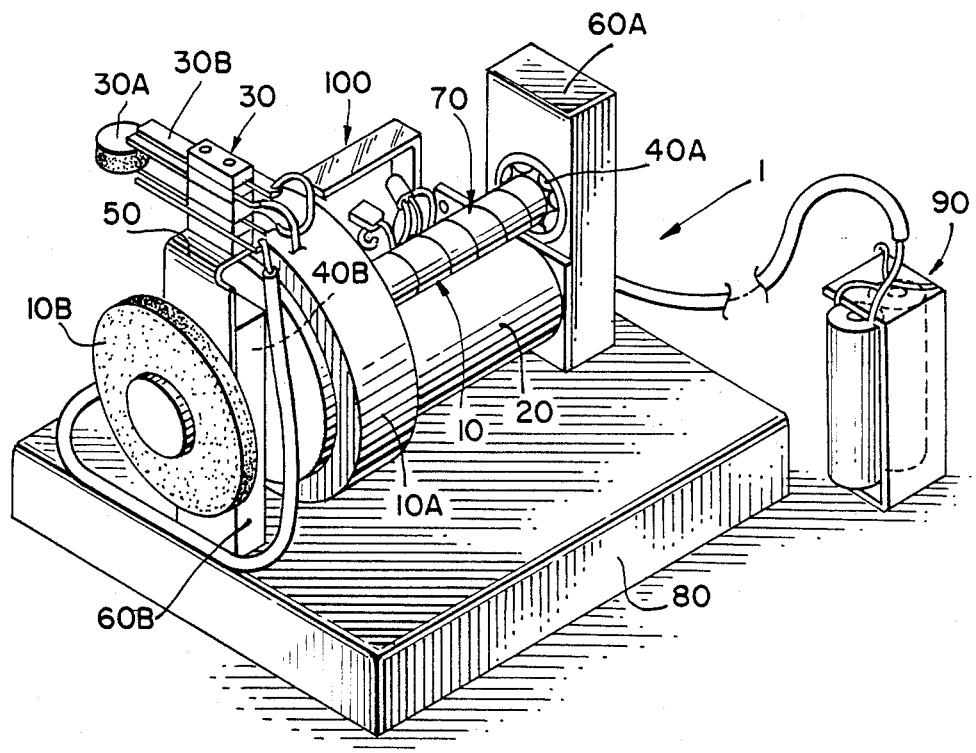
FIG. 1 is an overall view of a first embodiment of the present invention, showing its major components.
Figure 2:
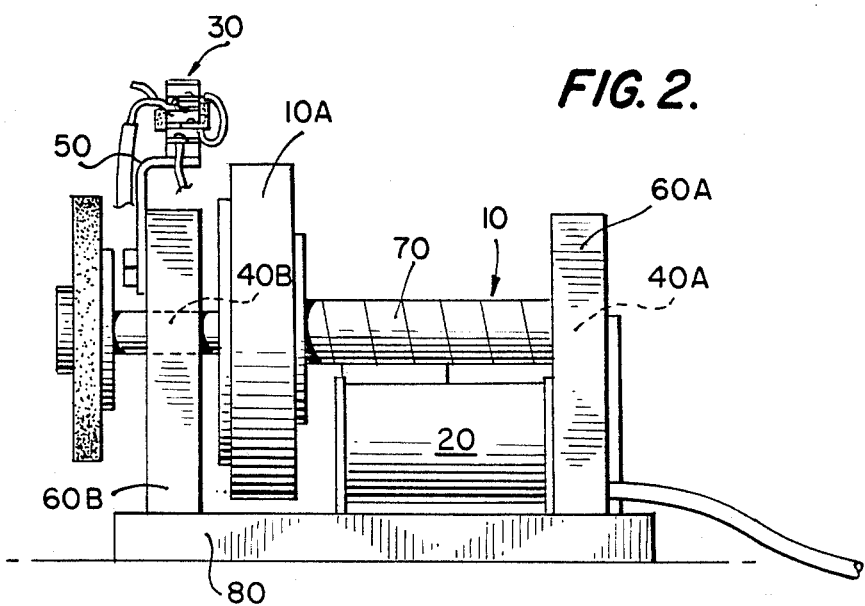
FIG. 2 is a first side view of the first embodiment shown in FIG. 1.
Figure 3:
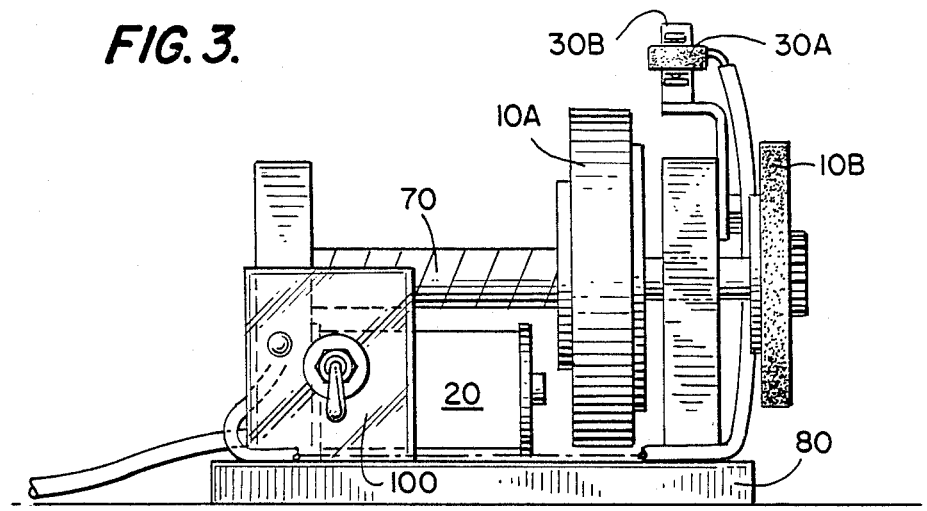
FIG. 3 is a second side view of the first embodiment prominently displaying the power switch.
Figure 4:
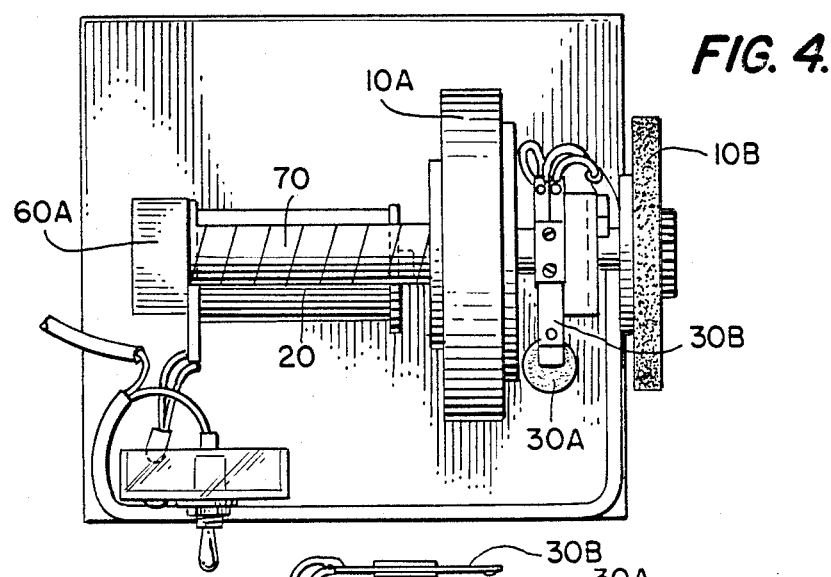
FIG. 4 is a top view of the first embodiment shown in FIG. 1.
Figure 5:
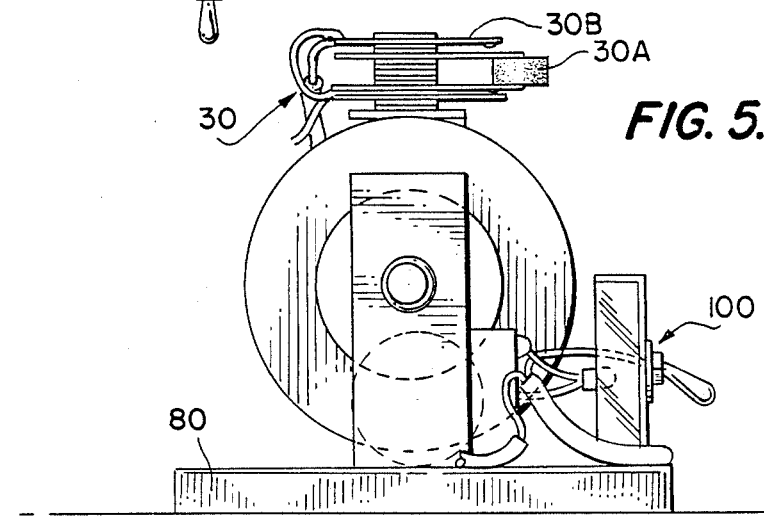
FIG. 5 is an end view of the first embodiment.

Referring to FIGS. 1-5 and FIG. 1 in particular, the first embodiment of the present brushless DC motor is shown generally at 1. This embodiment includes a magnetic rotor assembly 10, an electromagnetic torque inducing stator coil 20, a magnetic rotor sensing switch 30, a rotor position sensing switch actuating element 30A, a rotor position sensing leaf switch 30B, rotor bearing assemblies 40A, 40B, a rotor position sensing switch support bracket 50, end brackets 60A, 60B, a rotor shaft 70, a base 80, DC power supply 90 and power switch pilot light assembly 100.

Magnetic rotor 10 consists of an annular unitary, flat ferrous-oxide permanent magnet 10A. In an alternate embodiment, magnetic rotor 10 consists of an annular, unitary, flat ferrous-oxide permanent magnet that is cut into two equal parts along its surface. Magnetic rotor 10 is mounted onto a brass sleeve (not shown). Associated plate washers (also not shown) are provided for positioning and necessary bearing support. The entire ferrous metal rotor assembly 10 is carried on a rotor shaft 70 of circular cross-section, and located and positioned within circular shaped cut-outs passing through and brackets 60,60A by rotor bearing assemblies 40A,40B. Torque output from the instant invention is delivered by rotor shaft 70 which passes through at least one end bracket, either 60 or 60A.

Torque inducing stator coil 20 consists of a ferromagnetic material, preferably a soft iron coil core wound on a nylon bobbin with enamel coated magnet wire of suitable guage. Torque inducing stator coil 20 is reliably secured to end bearing 60A by any attachment means suitable for this purpose.

Rotor position switch sensor assembly 30 may comprise either the combination of an annular ferrous-oxide permanent magnet 30A and a two pole leaf switch 30B, or in the alternative, the combination of a semicircular ferrous-oxide permanent magnet 230A and a two pole reed switch 230B. The two pole leaf switch 30B is resiliently biased and arranged such that one pole is normally open and the other pole is normally closed, due to the urging of the resilient biasing means. The ferrous-oxide permanent magnet rotor position switch actuator element 30A is attached to the outer-most end of leaf switch stack 30B so as to be in close proximity to the magnetic element of the rotor assembly 10. Permanent magnet 30B serves to set the home, or starting, position of rotor assembly 10. Permanently magnet 30A is fastened to leaf switch 30B by bonding, welding or other reliable attachment means. The rotor position sensor switch assembly 30 is attached, by suitable fastening means, to switch support bracket 50. The switch support bracket 50 is in turn reliably fastened to end bracket 60B. The location of rotor position switch assembly 30 within the influence of the magnetic field created by permanent magnet 10A of rotor assembly 10 is critical to operation of this brushless DC motor. Switch assembly 30 is best located no more than one inch away from permanent magnet 10A, and along the periphery of permanent magnet 10A, at an angle that is between 45° and 85° from the stator coil 20 in the plane of rotation. Reed switch 230B is biased open, and is mounted vertically upon bearing support bracket 60B. Semicircular ferrous-oxide permanent magnet 230A is reliably fastened to rotor shaft 70 at the interspace between permanent magnet 10A and support bracket 60B.

Base 80 supports the entire motor apparatus, and can be formed of any suitably stable platform material capable of providing rigid support for end bearings 60A,60B.

Power supply 90 serves as a source of direct current to energize torque inducing stator coil 20. Power supply 90 is typically 12 volts DC, and may consist of the appropriate number of "AA" penlight batteries sufficient to produce 12 volts. Power supply 90 is connected serially with torque inducing stator coil 20 and rotor position sensor switch assembly 30.

A representative load is shown as 10B. For illustrative purposes, load 10B is shown as a grinding wheel, but in all practicality, can be any device requiring rotational motive power.

Figure 6:
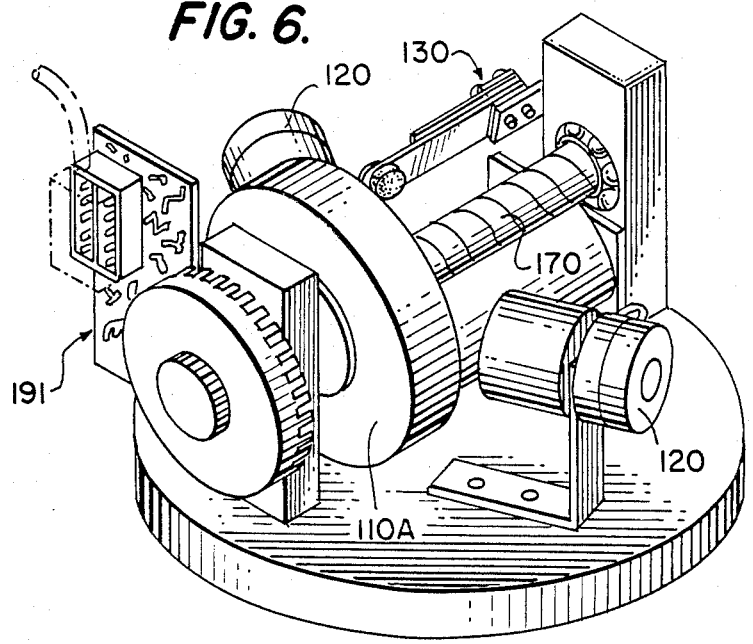
FIG. 6 is a perspective view of the second embodiment of the present invention showing its major components.
Figure 7:
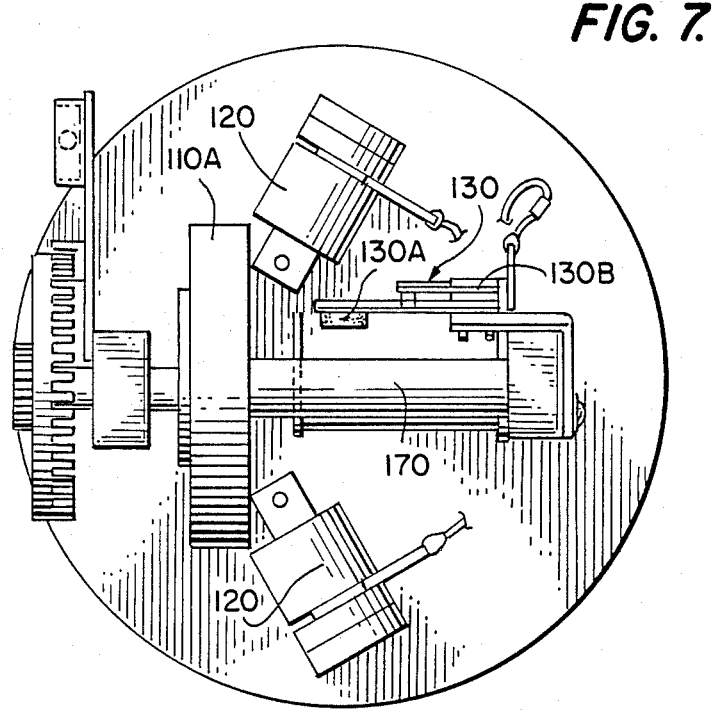
FIG. 7 is a top view of the second embodiment.
Figure 8:
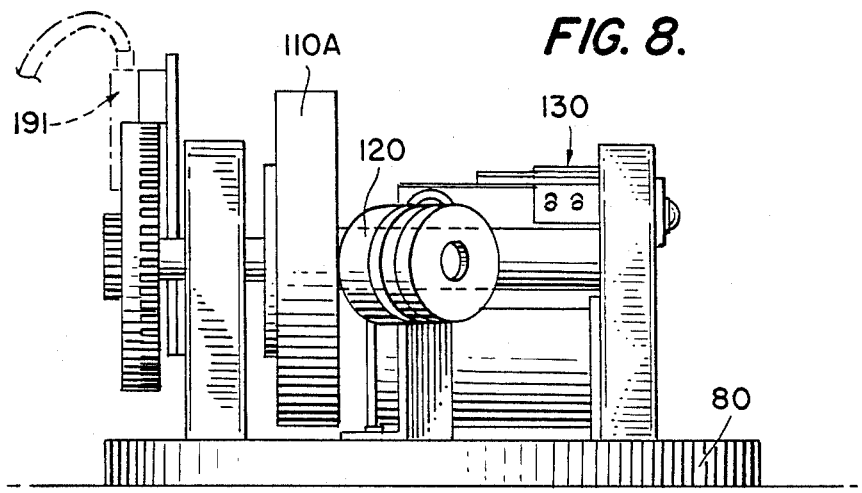
FIGS. 8 and 9 are side views of the second embodiment, prominently displaying the arrangement of its stator coils.
Figure 9:
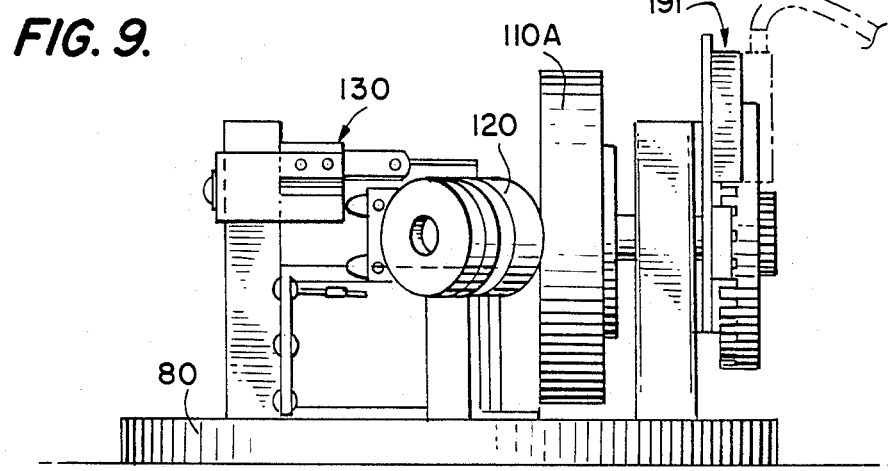
Figure 10:
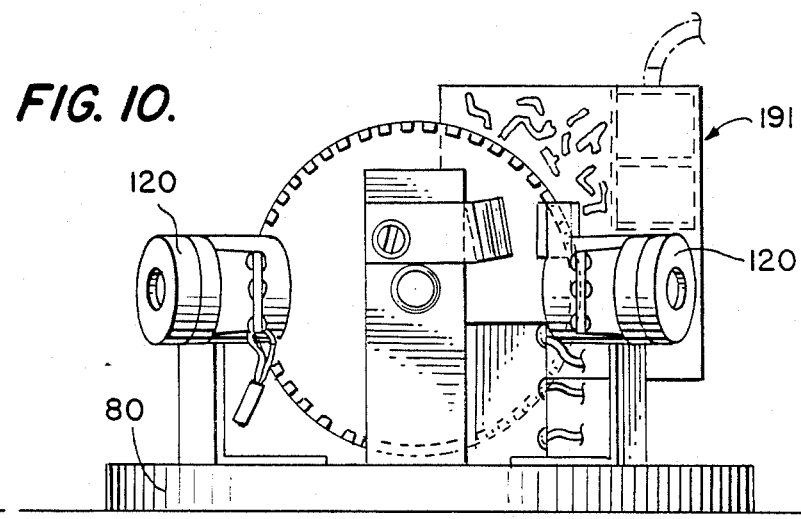
FIG. 10 is an end view of the second embodiment.
Figure 11:
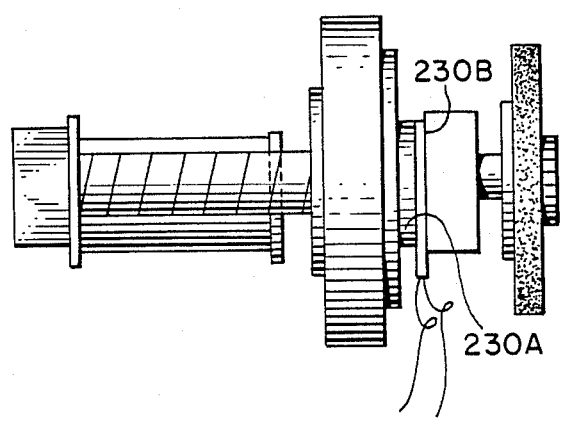
FIG. 11 is a top view of an additional embodiment of the present invention.

A second embodiment of the instant invention is drawn in FIGS. 6-10. This embodiment is provided with two torque inducing stator coils 120 and an integrated circuit (IC) speed governing device 191. Two pole permanent magnet 110A are carried by rotor shaft 170. Rotor position sensor switch assembly is shown as 130. This sensor consists of permanent magnet 130A and leaf switch stack 130B. All other components are generally similar to the corresponding components depicted on the first embodiment previously described.

Rotation of rotor assembly 10 places the magnetic poles of permanent magnet 10A into proximity with permanent magnet 30A or 230A so as to alternately open and close switch 30B or 230B, thereby causing coil 20 to correspondingly develop a magnetic polarity that first repels, then attracts the poles of permanent magnet 10A, as rotor assembly 10 rotates.

Although coil 20 has two poles, it need have only one pole exposed to the planar surface of permanent magnet 10A, due to the single direction in which it is wound. Torque inducing stator coil 20 develops it poles when current passes through its windings only, and the pole designation remains constant and does not reverse itself. Thus, when rotor 10 travels through its cycle of rotation, it will deliver to rotor position sensor switch 30 or 230 a pole that will eventually oppose sensor switch actuator 30A or 230A, causing switch 30 or 230 to open, or allowing switch 30 to 230 to close. This open-close action alternately energizes and then de-energizes coil 20. When coil 20 is energized by the action of switch assembly 30 or 230, coil 20 will develop a magnetic polarity of its own that either will attract or repel rotor magnet 10A, depending upon which pole is delivered to coil 20. A pole of polarity opposite that of coil 20, or a pole of similar polarity as coil 20, will cause rotation of the rotor assembly 10. Rotor assembly 10 tends to continue through its rotation due to the high mass inertia of permanent magnet 10A.

While there are shown and described preferred embodiments of the present invention, it is to be distinctly understood that this invention is not limited thereto, but may be otherwise variously embodied and practiced within the scope of the following claims.

What is claimed is:

1. A brushless DC motor comprising:
   a source of direct electrical current;
   a ferrous metal rotational output shaft;
   an annular, unitary, flat, two-pole permanent magnet mounted upon said output shaft transversely to the axis of rotation;
   a stator coil provided with a ferrous metal core located within the magnetic field of said two-pole permanent magnet and energized by said source of direct electrical current; and
   a magnetically influenced switch mounted within the magnetic field of said two-pole permanent magnet, but removed from the magnetic influence of said stator coil, and connected in series with said source of direct electrical current and said stator coil for controlling the current applied to said coil based upon the position of said two-pole permanent magnet with respect to said switch, whereby said switch is operated in a smooth manner.

2. The brushless DC motor is accordance with claim 1 wherein said magnetically influenced switch comprises:
   a double pole double throw leaf switch resiliently biased in the closed position; and
   a permanent magnet fixedly attached to the end of said leaf switch; wherein said leaf switch is mounted within the magnetic field of said two-pole permanent magnet, but removed from the magnetic influence of said stator coil, to alternately open and close in response to an alternating magnetic field, whereby said switch is operated in a smooth manner.

3. The brushless DC motor in accordance with claim 1 wherein said magnetically influenced switch comprises:
   a single-pole-single-throw reed switch resiliently biased in the open position; and
   a semicircular permanent magnet fixedly attached to the said two-pole magnet; wherein said reed switch is mounted within the magnetic field of said semicircular permanent magnet to alternately open and close said reed switch in response to an alternating magnetic field.

4. The brushless DC motor in accordance with claim 1 wherein said switch is polarized.

5. The brushless DC motor in accordance wtih claim 2 wherein said magnetically influenced switch is magnetically polarized.

6. A brushless DC motor comprising:
   a source of direct electrical current;
   a ferrous metal rotational output shaft;
   an annular, two-part, flat, two-pole permanent magnet mounted upon said output shaft transversely to the axis of rotation;
   a stator coil provided with a ferrous metal core located within the magnetic field of said two-pole permanent magnet and energized by said source of direct electrical current; and
   a magnetically influenced switch mounted within the magnetic field of said two-pole permanent magnet, but removed from the magnetic influence of said stator coil, and connected in series with said source of direct electrical current and said stator coil for controlling the current applied to said coil based upon the position of said two-pole permanent magnet with respect to said switch, whereby said switch is operated in a smooth manner.

7. The brushless DC motor in accordance with claim 6 wherein said magnetically influenced switch comprises a two-pole leaf switch resiliently biased in the closed position: and
   a permanent magnet fixedly attached to the end of said leaf switch; wherein said leaf switch is mounted within the magnetic field of said two-pole permanent magnet, but removed from the magnetic influence of said stator coil, to alternately open and close said leaf switch smoothly in response to an alternating magnetic field.

8. The brushless DC motor in accordance with claim 6, wherein said magnetically influenced switch comprises:
   a single pole-single throw reed switch resiliently biased in the open position and
   a semi-circular permanent magnet fixedly attached to the said two-part, two-pole magnet wherein said reed switch is mounted within the magnetic field of said semi-circular permanent magnet, but removed from the magnetic influence of said stator coil, to alternately open and close said reed switch smoothly in response to an alternating magnetic field.

9. The brushless DC motor in accordance with claim 6 wherein said magnetically influenced switch is magnetically polarized.

10. The brushless DC motor in accordance with claim 7 wherein said magnetically influenced leaf switch is magnetically polarized.

* * * * *